United States Patent
Vutetakis et al.

(10) Patent No.: US 7,635,537 B2
(45) Date of Patent: Dec. 22, 2009

(54) LEAD-ACID STORAGE BATTERIES WITH LIGHTWEIGHT CONNECTORS

(75) Inventors: David G. Vutetakis, High Point, NC (US); John B. Timmons, Winston-Salem, NC (US); Ramesh C. Bhardwaj, Walnut, CA (US)

(73) Assignee: Concorde Battery Corporation, West Covina, CA (US)

( * ) Notice: Subject to any disclaimer, the term of this patent is extended or adjusted under 35 U.S.C. 154(b) by 772 days.

(21) Appl. No.: 11/174,703

(22) Filed: Jul. 5, 2005

(65) Prior Publication Data

US 2007/0009790 A1    Jan. 11, 2007

(51) Int. Cl.
*H01M 6/42* (2006.01)

(52) U.S. Cl. ............ 429/149; 429/159; 429/160; 429/161

(58) Field of Classification Search ............. 429/149, 429/151, 156, 157, 158, 159, 160, 161; 439/754, 439/522, 762; 428/645
See application file for complete search history.

(56) References Cited

U.S. PATENT DOCUMENTS

| | | | |
|---|---|---|---|
| 3,767,889 A | 10/1973 | Sano et al. | |
| 3,944,436 A | 3/1976 | Gaide | |
| 3,960,602 A | 6/1976 | Schenk, Jr. et al. | |
| 3,981,742 A | 9/1976 | Yonezu et al. | |
| 4,347,294 A | 8/1982 | Mejia | |
| 4,760,001 A | 7/1988 | Nann et al. | |
| 5,169,734 A | 12/1992 | Rao et al. | |
| 5,264,306 A | 11/1993 | Walker, Jr. et al. | |
| 5,344,725 A | 9/1994 | Ide et al. | |
| 5,424,148 A | 6/1995 | Mrotek et al. | |
| 5,508,125 A | 4/1996 | Bantz et al. | |
| 5,650,242 A | 7/1997 | Rao et al. | |
| 5,659,946 A | 8/1997 | Harima et al. | |
| 5,709,966 A | 1/1998 | Sawada et al. | |
| 5,718,987 A * | 2/1998 | Misra et al. ............. | 429/160 |
| 5,776,207 A | 7/1998 | Tsuchida et al. | |
| 5,900,332 A | 5/1999 | Marukawa et al. | |
| 5,908,714 A | 6/1999 | Lund et al. | |
| 5,972,535 A | 10/1999 | Kump et al. | |
| 5,985,480 A | 11/1999 | Sato et al. | |
| 6,120,564 A | 9/2000 | Marukawa et al. | |
| 6,261,719 B1 | 7/2001 | Ikeda et al. | |
| 6,296,970 B1 | 10/2001 | Killebrew et al. | |
| RE37,804 E * | 7/2002 | Mattan ..................... | 429/181 |
| 6,455,190 B1 | 9/2002 | Inoue et al. | |

(Continued)

*Primary Examiner*—Raymond Alejandro
(74) *Attorney, Agent, or Firm*—Womble Carlyle Sandridge & Rice, PLLC; C. Robert Rhodes (57) ABSTRACT

Lead-acid storage batteries of the type having a plurality of cells, each including alternating positive and negative plates, each plate including an upstanding lug, and a partition separating adjacent cells are provided with unique improved lighter weight and lower resistance plate and intercell connectors. The connector comprises at least one cell plate connector including a wall with a multiple spaced slots for receiving the lugs from either the positive or negative plates of the cells. A strap extends from the cell plate connector. The cell plate connector and the strap are formed of a metal substrate that has a lower specific gravity and higher conductivity than lead, the substrate having a lead-based outer coating that resists the corrosive effects of the battery acid. A small amount of lead is then applied covering the slotted wall and at least a portion of each lug to insure good connection.

9 Claims, 10 Drawing Sheets

U.S. PATENT DOCUMENTS 6,455,191 B2    9/2002   Omae et al.
6,632,562 B1    10/2003  Nakatsuka et al.
6,818,345 B1 *  11/2004  Partington et al.  .......... 429/160

2002/0015882 A1  2/2002  Yang
2003/0054240 A1  3/2003  Aronsson

* cited by examiner

LEAD-ACID STORAGE BATTERIES WITH LIGHTWEIGHT CONNECTORS

FIELD OF THE INVENTION

The present invention is directed to lead-acid batteries, and particularly to new and unique lightweight and low-resistance intercell and terminal connectors formed primarily of a relatively lightweight and conductive metallic substrate covered by a lead-based, corrosion-resistant outer coating.

BACKGROUND OF THE INVENTION

Lead-acid batteries conventionally include a multiplicity of cells connected together in series. Each cell consists of a stack of alternating electrode plates, namely cathodes and anodes, each electrode plate having an upstanding lug for electrical interconnection with lugs of similar polarity. Also there is a separator between the electrode plates which prevents shorting of the plates, while allowing ion transport through the electrolyte (generally sulfuric acid). The cells are arranged in a container having partitions that separate adjacent cells. Cast lead connector straps then connect the upstanding lugs from plates of similar polarity in each cell and cast lead intercell connector or straps interconnect adjacent cells in a serial or parallel arrangement.

In the past, as stated above, intercell and terminal connectors or "straps" in lead-acid storage batteries have been formed primarily of castings of lead or of a lead alloy. Lead has predominately been the material of choice for this application for a long time. While lead is not itself a particularly good conductor of electricity, it is inherently corrosive resistant to the sulfuric acid electrolyte contained within the battery. For their relatively low cost, lead-acid batteries provide a modest energy density (the amount of energy produced) per pound of weight, and have a relatively long service life. Other, more conductive metals are either too expensive to be used as the internal connectors in lead-acid batteries, or else they are quickly corroded by the sulfuric acid electrolyte.

For most applications weight is not a factor, and therefore lead is the material of choice for connectors; however, lead is also very heavy, and therefore in applications where weight is a factor, other alternatives have long been sought.

For example, in the aircraft industry, experts have calculated that the fuel cost of flying a commercial airliner is more than $3,000 per year per pound of weight flown. Therefore, if the plane carries batteries having connectors made entirely of led, considerable sums of money could be saved per plane if a lighter weight materials for the connectors could be found.

SUMMARY OF THE INVENTION

The present invention is directed toward new lightweight, low-resistance connectors for otherwise conventional lead acid storage batteries of the type having a plurality of cells, each cell including alternating positive and negative plates, where each plate includes an upstanding lug for electrical interconnection, and a partition separating adjacent cells.

In its broadest aspect, the invention resides in the concept of replacing the heavy all-lead, cast intra-cell plate connector or straps and the intercell and terminal connector straps with a lighter weight connector body or member formed of a non-lead metal substrate that has a lower specific gravity and higher conductivity than lead and a thin lead-based outer coating that resists the corrosive effects of the sulfuric acid electrolyte. The trays are at least partially filled with lead that insures a good connection.

In one embodiment, the connectors of the present invention comprises at least one tray and a strap. Each tray includes a bottom wall and a plurality of side walls forming a box-like receptacles, the bottom wall including a plurality of spaced slots for receiving and mating engagement with the lugs from either the positive or negative plates of the cell. The strap extends from one side of the tray. The walls of the tray and the strap are formed of the non-lead metal substrate and the lead-based outer coating.

One aspect of the internal connector of the present invention is directed to an intercell connector. The intercell connector includes a pair of opposed trays and an intercell crossover portion. Each of the opposed trays includes a bottom with spaced apart elongate slots for receiving the lugs of either a positive or negative plate, opposed side walls, and opposed end walls, and an open top. After emplacement on a cell, a prescribed depth of molten lead is deposited in the trays to connect the lugs of like charged plates. The intercell crossover portion interconnects the opposed trays and is dimensioned to bridge the partition separating adjacent cells. More particularly, and again the opposed trays and crossover portion are formed of a lightweight non-lead conductive substrate, such as copper, aluminum, or magnesium, or alloys thereof, the substrate having a lower specific gravity and higher conductivity than lead and a lead-based outer coating that resists the corrosive effects of the battery acid. By replacing the conventional all-lead construction with a lightweight substrate formed of copper, for example, and a lead-based outer coating, the total weight of a connector may be reduced by up to 50 percent. Further, the intercell crossover portion may be either integrally formed with the trays, or may be formed separately for subsequent connection to the opposed trays.

In another aspect, the trays of terminal connector may each comprise only a bottom wall, without any side or end walls. The slots formed in the bottom wall may also extend outwardly to an edge of the bottom wall where they are open on that edge for slideable engagement with a selected set of lugs.

Alternatively, the intercell connector of the present invention may comprise a multi-part construction formed of the same lighter weight material. In one alternative embodiment, the multi-piece connector comprises a first connector portion and a mating connector portion. The first connector portion comprises a pair of opposed flanges and a strap portion. Again, the opposed flanges provide for electrical interconnection of adjacent cells. Each flange comprises a bottom wall having a spaced slots. Unlike the previous embodiments, the slots extend outwardly to an edge of the bottom wall so that the slots are open on the outer edge. Formed in this manner, the open slots permit the connector to slideably engage the lugs of the selected cell, rather than having to be fitted over the tops of the lugs. To secure the connector in place once it is slideably engaged to the lugs, either a (1) single mating connector portion slideably engages the opposite ends of the lugs that have already been engaged by the first connector portion, or (2) separate mating connector portions (without a crossover portion) engaged to the lugs on each of the opposed flanges. Once in place, either of these two multi-piece connector assemblies may be inverted and dipped into a molten lead or lead-alloy bath to cover the lugs and bond the two or three portions of the connector to the lugs.

Yet another aspect of the invention is directed to a lightweight, low-resistance terminal connector for a lead acid storage battery. The tray again has a bottom with spaced apart elongate slots for receiving the lugs of either positive or negative plates, opposed side walls and opposed end walls having upper edges, and an open top. Molten lead is again deposited in the tray. The flange extends outwardly from one of the upper edges, and the terminal post is connected to the flange. The tray and flange are also formed of a lightweight a non-lead conductive substrate, such as copper, aluminum, or magnesium, or alloys thereof, the substrate having a lower specific gravity and higher conductivity than lead and a lead-based outer coating that resists the corrosive effects of the battery acid. While the terminal post may be formed entirely of a lead-based material, the post preferably is formed with a lightweight, low-resistance core that has an outer corrosive resistant coating of lead-based material.

Alternatively, the terminal connector of the present invention may comprise a tray and a flange, wherein the tray comprises only a bottom wall, without any side or end walls. The slots formed in the bottom wall may also extend outwardly to an edge of the bottom wall where they are open on that edge for slideable engagement with a selected set of lugs. Further, the terminal connector may also comprise a multi-part construction wherein a mating connector portion is provided and dimensioned for mating engagement with bottom wall and alignment with the slots formed therein.

Other than the configuration and material of the call plate connectors, the intercell connectors, and the terminal connectors, the construction of the lead-acid batteries are substantially unchanged.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DESCRIPTION OF THE PREFERRED EMBODIMENTS

Certain exemplary embodiments of the present invention are described below and illustrated in the attached Figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art, and all such alternate embodiments, modifications and improvements are within the scope of the present invention.

Figure 1:
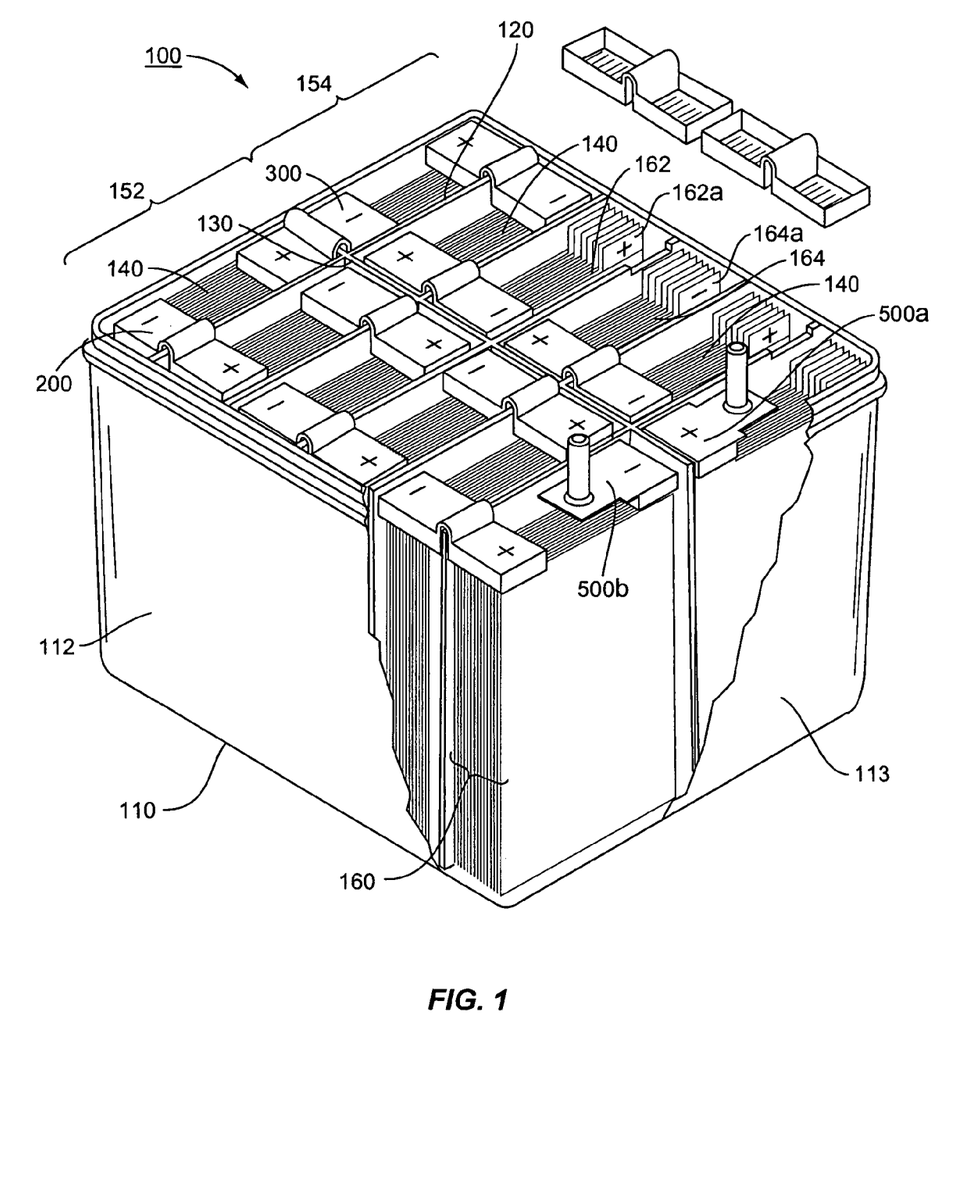
FIG. 1 is illustrative of the installation of the lightweight, low-resistance internal connectors of the present invention as installed on an otherwise typical lead-acid battery base.

Referring now to FIG. 1, and by way of a general summary of the present invention, there is illustrated a lead-acid storage battery, the base and cell arrangement of which is designated generally as 100. As is conventional in lead-acid battery construction, the battery 100 comprises a container 110 having opposed side 112 and end walls 113 to create a box-like construction. A plurality of integral or separately attachable partitions 120 and 130 divide the container 110 into a plurality of individual cells 140. Each cell 140 is dimensioned to receive a vertical stack 160 comprising alternating positive 162 and negative 164 electrode plates. The actual number of plates in each stack 160 is dependent upon the desired capacity and current rating of the battery 100. In the battery shown in FIG. 1, 12 cells 140 comprise the assembly, or "monobloc", the 12 cells 140 assembled into two rows 152, 154 of 6 cells each. Each electrode plate 162, 164 further comprises an upstanding lug 162a, 164a at one end of the plate, 162, 164. As those skilled in the art will appreciate, in each stack 160, the lugs at one end of the stack 160 are all of the same polarity, e.g., positive or negative, and all of the lugs at the opposite end of the stack 160 are of the opposite polarity. Where, as in FIG. 1, a serial arrangement of cells is desired, the adjacent stacks 160 in each row are inserted so that the positive lugs 162a in one cell are adjacent the negative lugs 164a in the adjacent cell. In a parallel arrangement, the lugs adjacent to the partitions 120 in each cell 140 have the same polarity as the lugs adjacent to the partition 120 in the same row, 152 or 154. The above description is typical of the base and cell arrangement in conventional lead-acid batteries. While not shown in FIG. 1, a typical battery construction will use pre-cast, heavy, lead members welded to the plate lugs of a cell, and heavy lead castings welded to the lead connector members to connect the cells together.

In the present invention, and as shown generally in FIG. 1 and more particularly in FIGS. 2-10b, the lighter weight connectors of the present invention are designated as 200, 300, and 500a and 500b. Connectors 200 are intercell connectors for electrically interconnecting the positive lugs 162a in one cell to the negative lugs 164a in the adjacent cell in the same row. Connectors 300 are also intercell connectors and are illustrated for use in electrically interconnecting an end cell in one row to an end cell in the adjacent row to continue the serial arrangement across all 12 cells. Connectors 500 are terminal connectors. Terminal connectors 500 are electrically connected either to the positive or negative lugs on the end cells 140. As shown, each battery 100 comprises a positive terminal connector 500a and a negative terminal connector 500b.

Figure 2:
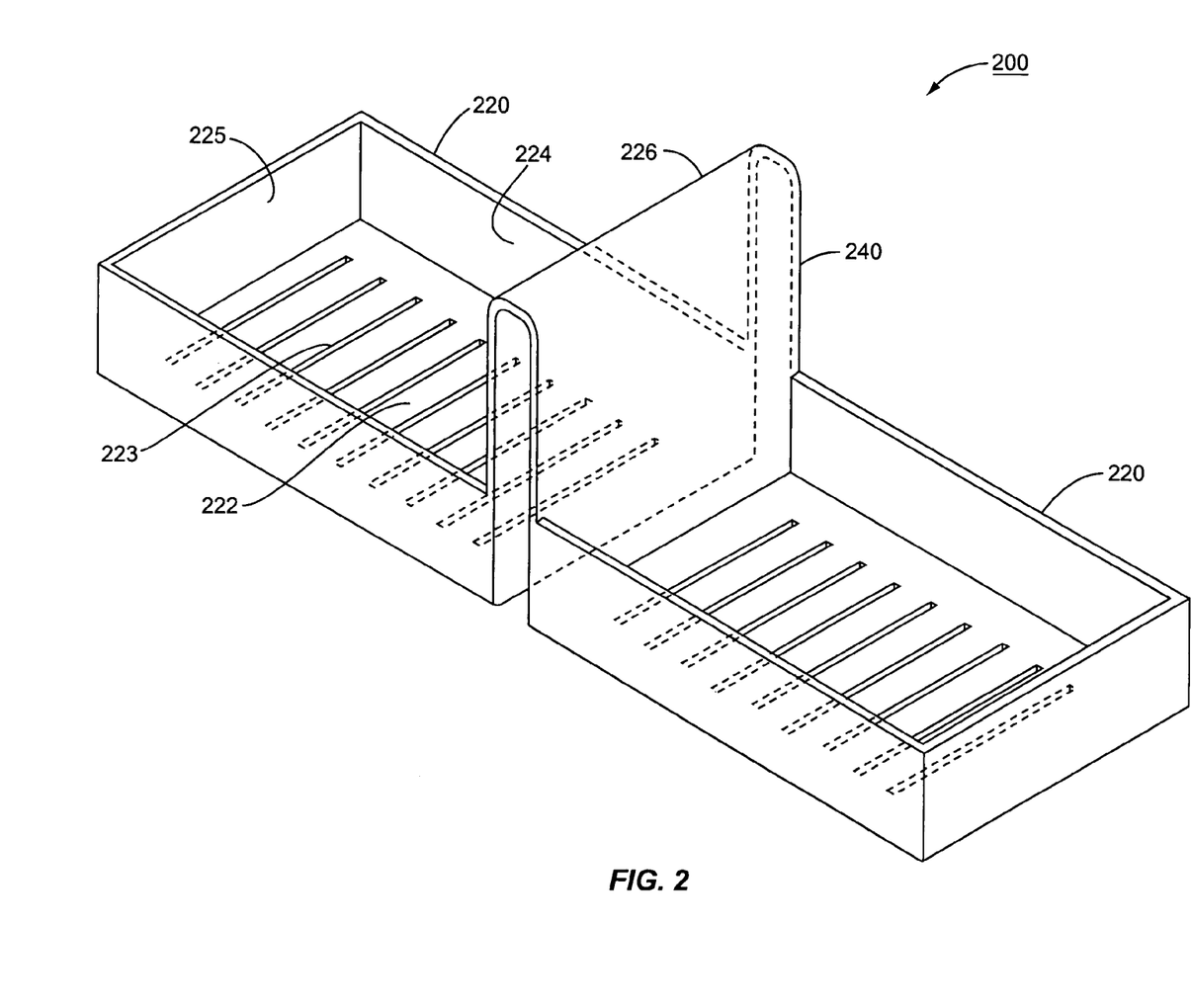
FIG. 2 is a top perspective view of one embodiment of an intercell connector formed in accordance with the present invention.

Turning now to FIG. 2, a first embodiment of the present invention is directed to an intercell connector 200 for electrically interconnecting the lugs of adjacent cells 140. As shown in FIG. 2, the lightweight connector 200 comprises at least one tray 220 and a strap portion 240. In the intercell connector 200 shown in FIG. 2, opposed trays 220 are provided for electrical interconnection of adjacent cells 140 in the same row and separated by a partition 120. Each tray 220 includes a bottom wall 222 and a plurality of opposed side and end walls 224, 225 that form a box-like receptacle. The bottom wall 222 includes a plurality of spaced slots 223 therein for receiving therethrough the lugs from either the positive or negative lugs of the respective cells 140. The strap 240 is formed as a cross-over member that is dimensioned to bridge over the partition 120 between adjacent cells 140. The cross-over member 240 extends upwardly from the inner walls 225 to common apex 226.

Figure 5:
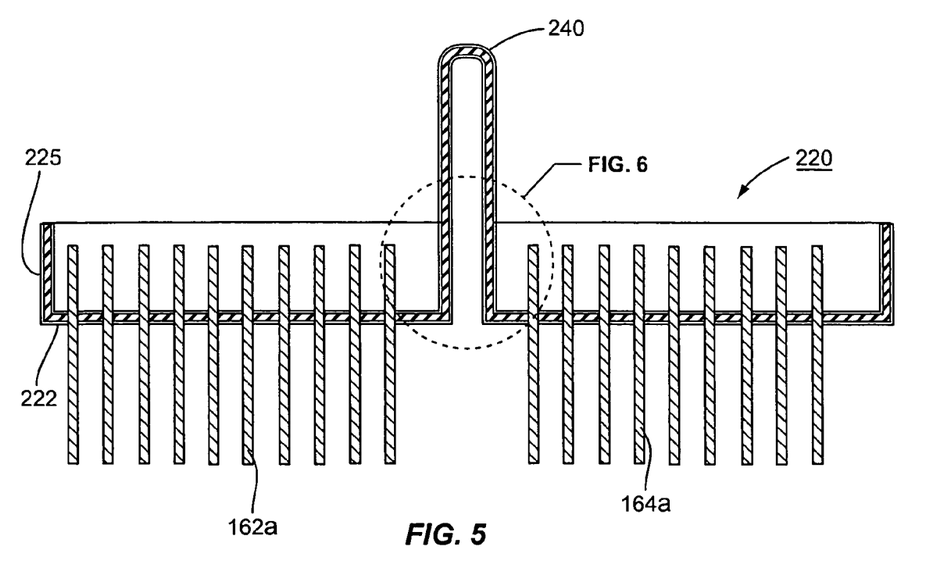
FIGS. 5 and 6 are sectional views of the intercell connector of FIG. 3.
Figure 6:
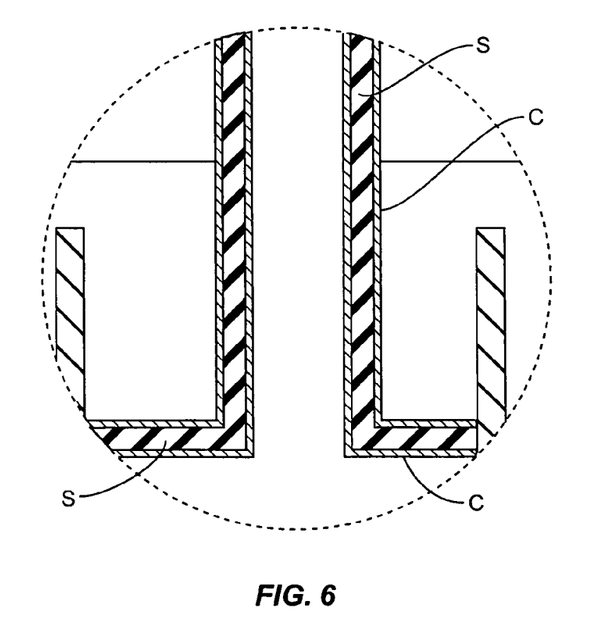

Unlike the conventional cast connectors known in the prior art, the connector trays of the present invention are a lightweight, composite construction which are only partially filled with a small amount of lead to insure good connection. Then the bridge or cross-over portion is essentially non-lead. Turning now to FIGS. 5 and 6, and as is common to each of the connectors described herein, the composite construction of the walls of all connectors is best illustrated. The bottom 222 and walls 224, 225 and the cross-over portion 240 are formed of a metal substrate, shown generally as S throughout (FIG. 6), that has a lower specific gravity and a higher conductivity than conventional lead. The lightweight substrate S has a lead-based outer coating shown generally as C throughout, that is selected to resist the corrosive effect of the sulfuric acid electrolyte.

For purposes of comparison, for the type of lead-acid storage battery described herein, traditional lead connectors would require a thickness of between about 0.25 inches and 0.75 inches to satisfy the requirements for maximum discharge current of the battery 100. The inventors have found that the thickness of the connector can be reduced by the ratio of the resistivity of the chosen substrate material, while retaining equivalent performance. The following table provides a comparison of some selected relevant materials compared to lead:

| Material | Specific Gravity | Resistivity (u-ohms) |
| --- | --- | --- |
| Lead | 11.35 | 22 |
| Aluminum | 2.7 | 2.82 |
| Copper | 8.9 | 1.72 |
| Magnesium | 1.74 | 0.80 |

An objective of the connector constructions of the present invention is to balance the thickness/weight of the connector with the discharge current of the connector without overheating. A substrate thickness of between about 0.020 inches and 0.060 inches is desirable depending upon the conductive substrate S material selected, but may possibly be as thin as 0.010 inches and as thick as 0.100 inches, without compromising the discharge or weight objectives of the connector.

As an exemplary construction, in a typical 24-volt monobloc construction such as that shown in FIG. 1, the total weight of the conventional cast, all lead connectors is about 3.0 pounds. Using copper as the substrate material of tray 220, copper has a specific conductivity that is about 12 times higher than lead; therefore, the total thickness of the substrate forming the walls, bottom, and cross-over portion can be reduced by this factor, while retaining the same performance characteristics. For a conventional lead thickness of 0.25 inches, the corresponding copper substrate need only be about 0.020 inches thick. In particular, the inventors have found that some alloys of copper provide more optimal hardness, strength, ductility, and surface properties for subsequent coating with a lead-based protective material. Copper alloys 102 and 110 are two that are especially suitable. While the exemplary embodiments described herein use a copper substrate S, aluminum and magnesium substrates may also be similarly employed and coated in similar fashion; however, these materials left unprotected in an acid environment would rapidly corrode. The metal substrate can be formed into the desired connector shape in numerous ways such as stamping and folding sheets or strips of metal, or alternatively by machining the substrate material to the desired thickness. Dimensions of the connector will vary according to the particular cell design, but depend on the number of positive and negative plates per cell, the thickness and width of the grid lugs, etc.

To prevent the substrate S from corroding in the sulfuric acid (electrolyte) environment of the cell 140, a thin, protective layer or coating of lead or lead alloy is required. The coating can be applied by any suitable means, including but not limited to electroplating, electroless plating, dipping or immersion, vacuum or plasma deposition. Suitable lead alloys are known in the art, and comprise a high lead percentage (90-99.5%) in combination with 0.5-5% tin, 0.5-5% tin plus 0.005-0.05 % silver, or 1-10% antimony. The inventors have also found that a coating thickness of between about 0.003 inches and 0.006 inches is desirable, but the coating may be as thin as 0.001 inches and as thick as 0.010 inches. In the example described above with a copper substrate of about 0.020 inches, a pure lead coating of about 0.004 inches is sufficient. So formed, this results in a total weight savings of 50% over the conventional all-lead connectors. Similarly, the inventors have found that a potential weigh savings of about 50% (1.5 pounds) can be achieved on various types of military aircraft batteries.

In the exemplary embodiment having a copper substrate, pure lead was coated on the copper substrate S by electroplating. It has been found that when electroplating is used, an electroplating current density of between about 5 and 50 $A/ft^2$, and desirably between about 25 and 30 $A/ft^2$ will provide a uniform pinhole-free coating of lead.

Figure 3A:
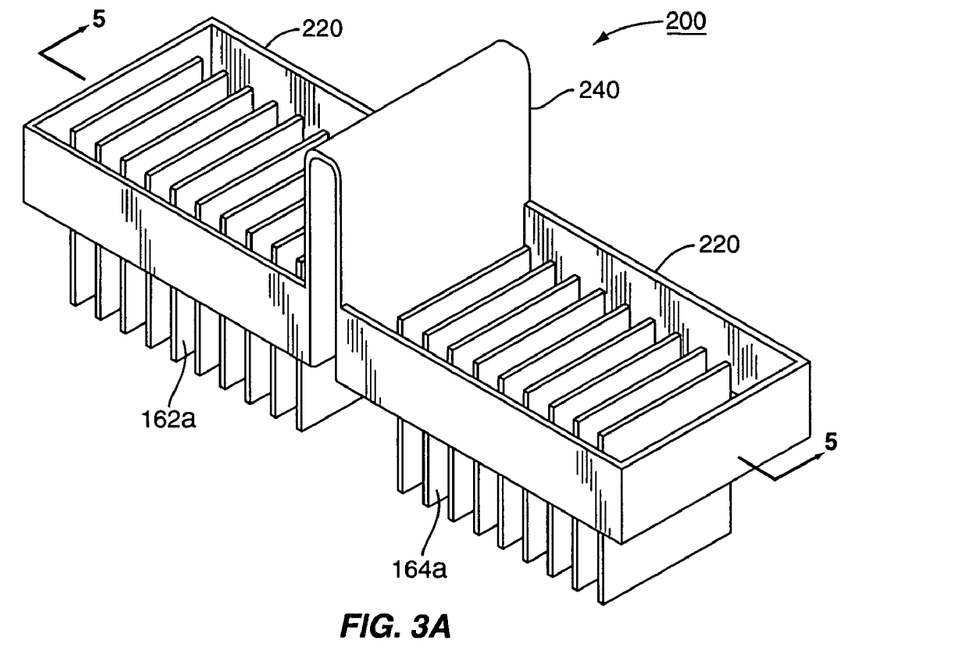
FIGS. 3A and 3B are illustrative of the internal connector of FIG. 2 installed over adjacent sets of lugs.
Figure 3B:
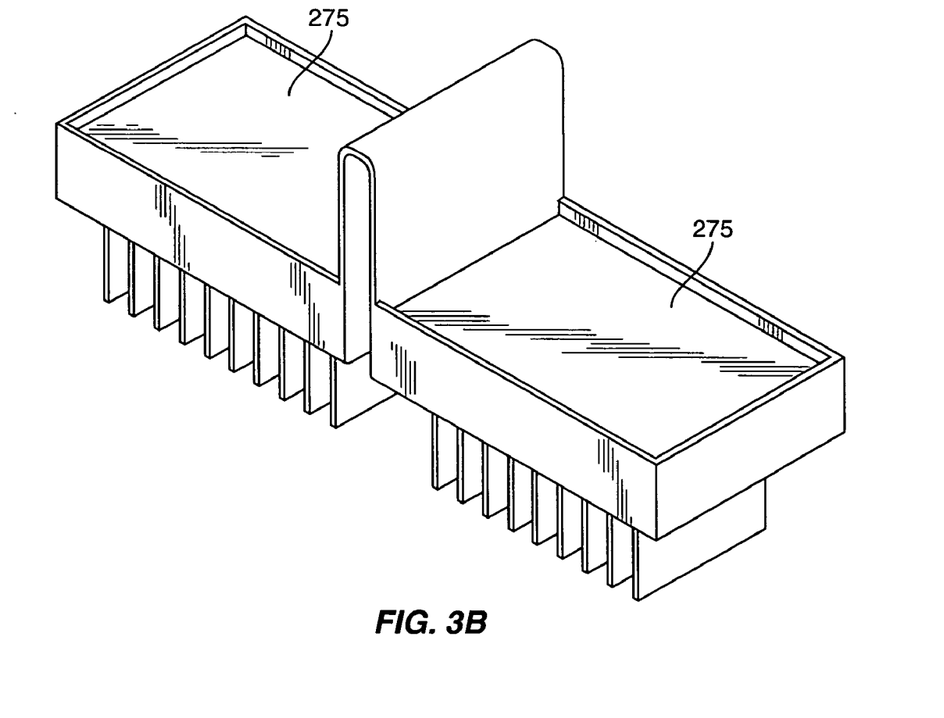

Turning now to FIGS. 3A and 3B, the intercell connector of FIG. 2 is shown to illustrate the installed position of the connector 200 with the lugs 162a, 164a of adjacent cells received therethrough slots 223. The width of the slots 223 in the bottom 222 of the connector 200 tray 220 should be dimensioned to provide a snug fit of each lug, preventing the subsequently applied molten lead described below from escaping around the slots 223. Generally, the slots are dimensioned to be between about 0.001 and 0.003 inches wider than the thickness of the lug. Once the connector 200 is situated in mating engagement with the lugs 164a, 164b of the adjacent cells, a molten lead or lead alloy 275 is added to each tray 220 to cover the lugs 162a, 164a and at least partially fill in the voids between and around the lugs. This is best shown in FIG. 3B. The depth of the molten lead in the tray 220 must be thick enough to assure a good bond with the grid lugs. While the lugs will desirably completely covered with the molten lead, as shown FIG. 3B, it may not be necessary to completely cover the lugs in all applications. Depths in the range of 0.10 inches and 0.20 inches have been found suitable, but can be potentially as little as 0.050 inches and as much as 0.50 inches; however, again, if the molten lead thickness is too great, the objective weight savings will be diminished. As will be appreciated, an additional benefit of this intercell connector 200 construction is that it eliminates the need for making conventional "lug-to-connector" welds or "through partition" connections, which are inherently less reliable and/or more labor intensive than the present invention.

Figure 4:
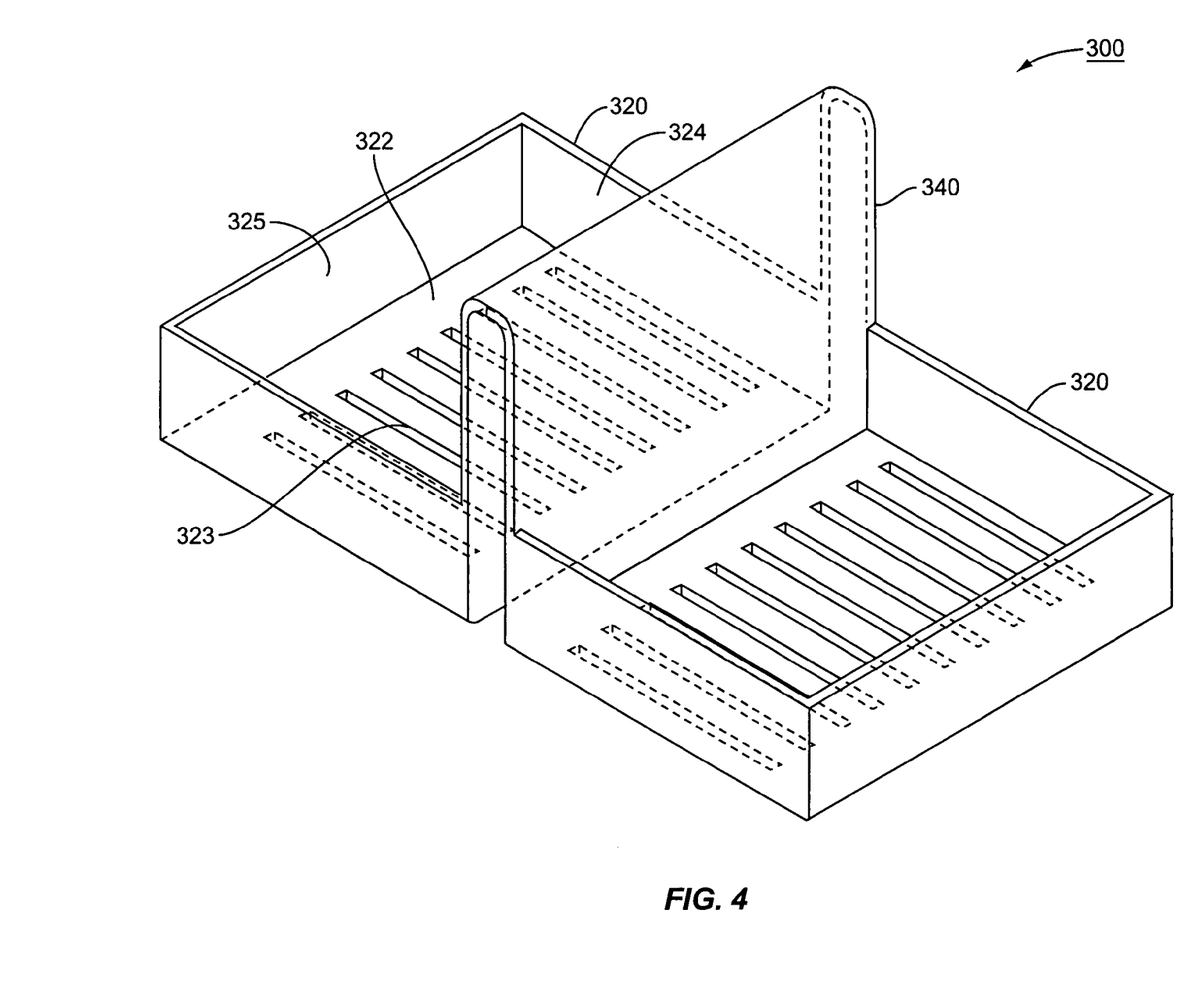
FIG. 4 is a is a top perspective view of an alternative embodiment of the intercell connector of the present invention.

Turning now to FIG. 4, a first alternative embodiment 300 of the intercell connector is shown. This intercell connector 300 is configured to interconnect the lugs of one cell 140 with the lugs of a cell in the adjacent row. The connector 300 also comprises opposed trays 320, with each tray having a bottom wall 322 and a plurality of side walls 324, 325 to form a box-like receptacle. In this embodiment, the bottom walls 320 also include a plurality of spaced slots 323 therein for receiving therethrough the lugs from the two adjacent cells. Of note in FIG. 4 is that the slots 323 are aligned substantially parallel to the side walls 324 since the lugs being engaged are in adjacent rows. The cross-over portion 340 is thus dimensioned to bridge over the partition 130 that separates the two rows of cells 140. In all other respects, the construction and method of installing connectors 300 is similar to that of the connector 200 of the first embodiment.

Figure 7:
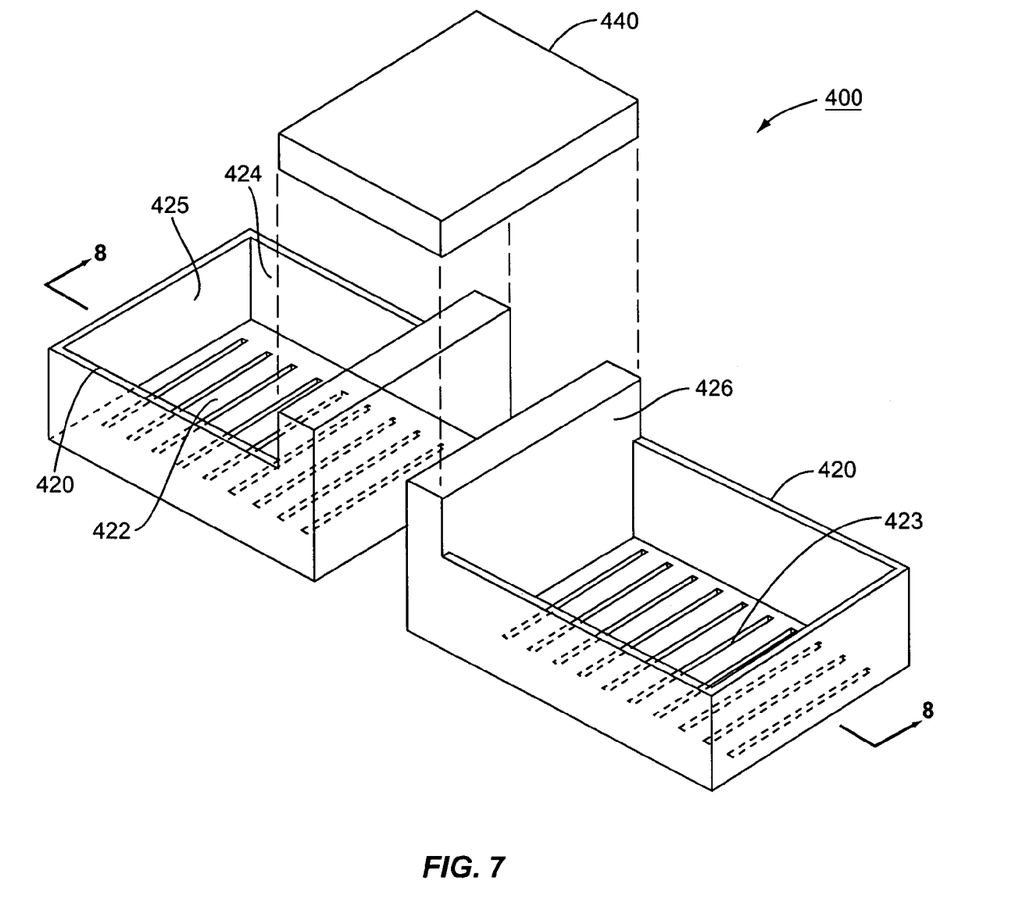
FIG. 7 is a second alternative embodiment of the intercell connector of the present invention.
Figure 8:
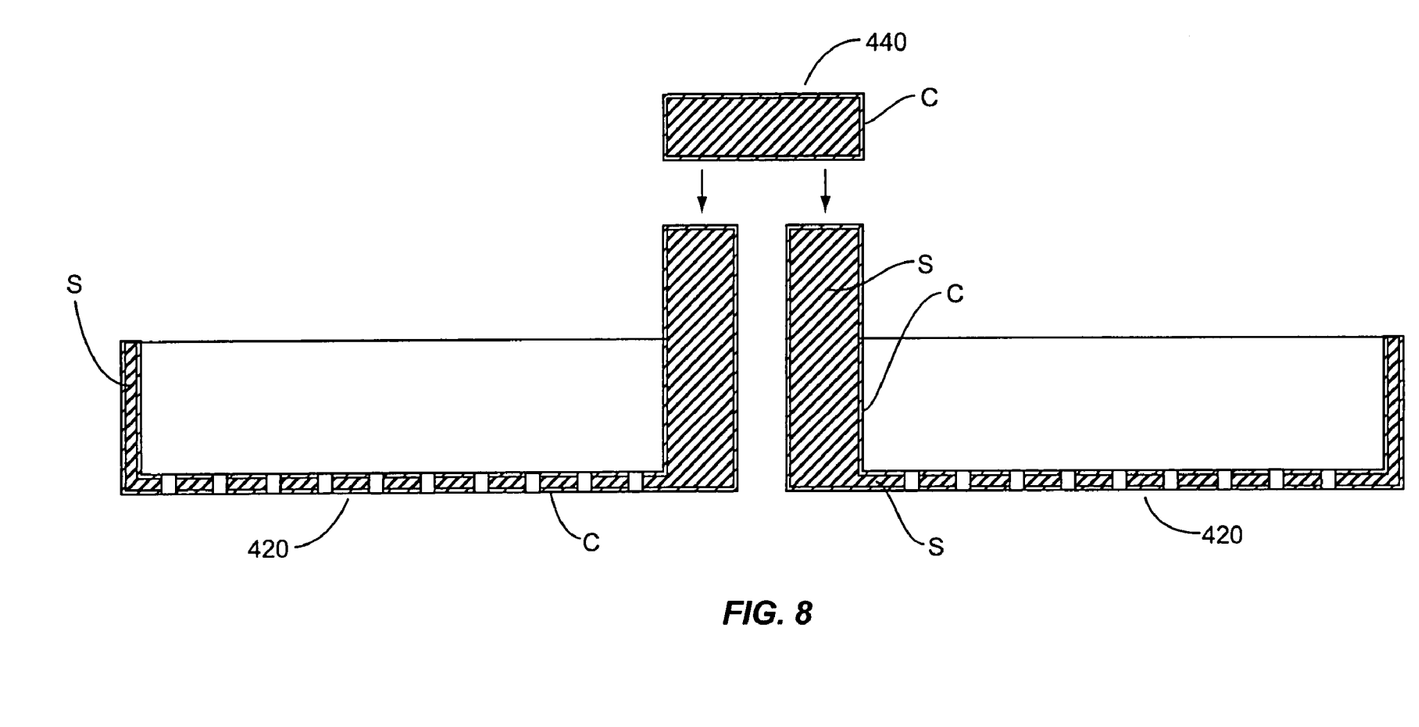
FIG. 8 is a sectional view of the intercell connector of FIG. 7 taken along Line 8-8.

Referring now to FIGS. 7 and 8, another embodiment of the intercell connector 400 is shown. While functionally and structurally similar to connectors 200 and 300 when installed, this embodiment 400 is constructed of separate pieces. Again, the connector 400 comprises opposed trays 420, each tray having a bottom wall 422 with slots 423, and walls 424, 425. Upstanding inner walls 426 project upwardly for alignment and connection with the crossover portion 440. This embodiment permits the trays 420 to first be installed over the selected lugs of a cell 140 and then joined together by welding or soldering after the lugs are bonded in the trays 420 with molten lead. As illustrated in the sectional view of FIG. 8, the bottom 422, walls 424, 425, 426, as well as the crossover member 440 all comprise a substrate S, as described above, that is coated with a lead-based corrosion resistant coating C.

Figure 9A:
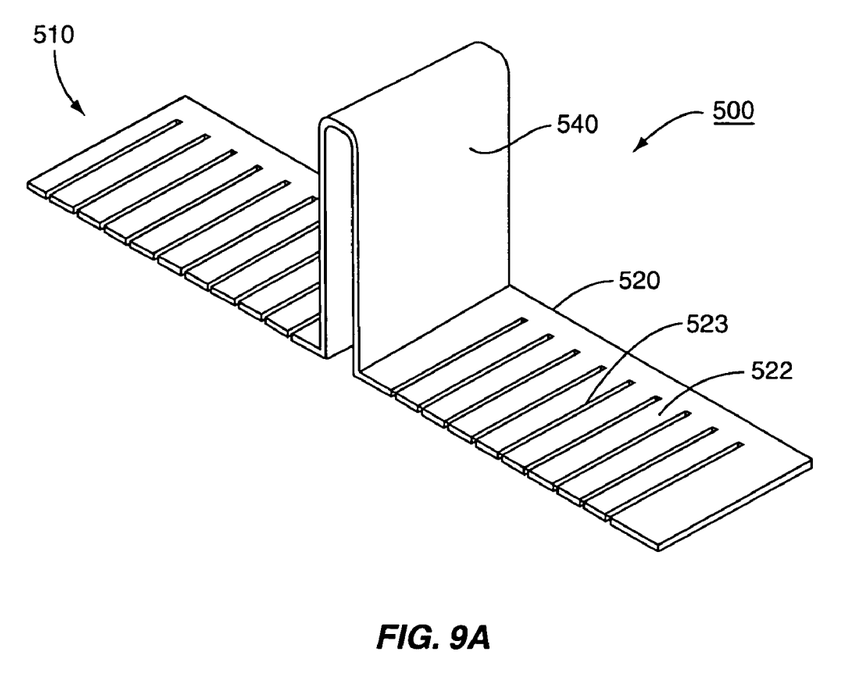
FIGS. 9A through 9D are illustrative of alternative embodiments of the internal connector of the present invention.

FIGS. 9A through 9D are directed to additional single and multi-piece embodiments 500, 600 of the intercell connector of the present invention. Referring first to FIG. 9A, one alternative embodiment 500 comprises a connector portion 510. The connector portion 510 comprises a pair of opposed flanges 520 and a strap portion 540. Again, the opposed flanges 520 are provided for electrical interconnection of adjacent cells 140. Each flange 520 comprises a bottom wall 522 having a plurality of spaced slots 523 therein. Unlike the previous embodiments, the slots 523 extend outwardly in one direction to an edge of the bottom wall 522, wherein the slots are open on the outer edge. Formed in this manner, the open slots 523 permit the connector 500 to slideably engage the plate lugs of the selected cell, rather than having to be fitted over the tops of the lugs. This is particularly advantageous when the cells to be interconnected comprise a larger number of relatively thin electrode plates. Again, the flanges 520 and strap portion 540 are formed of a metal substrate having a lead-based outer coating.

Figure 9B:
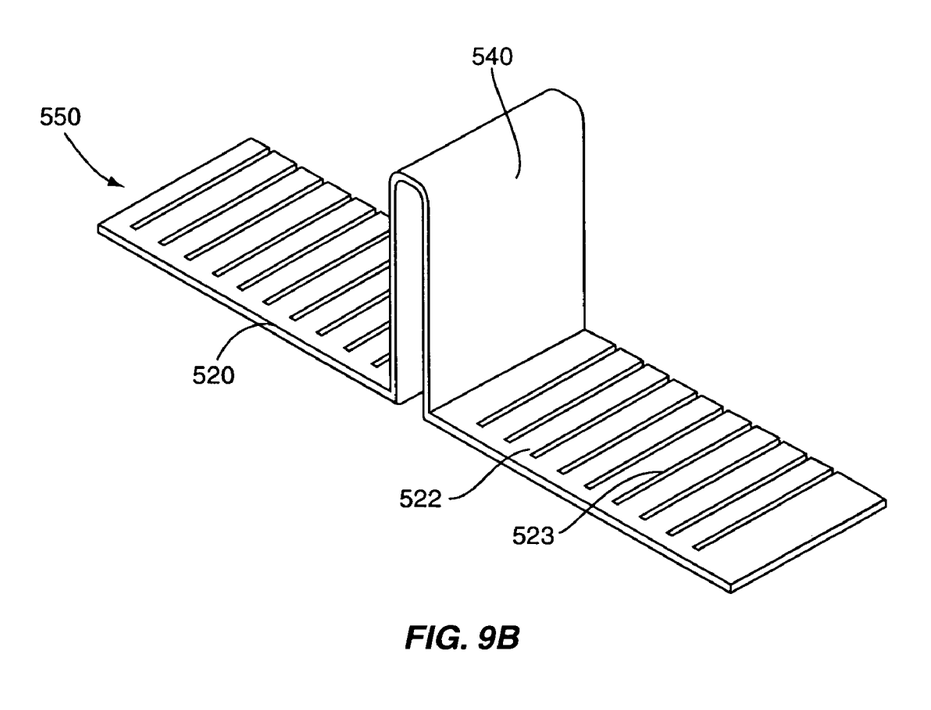

In some applications, it may be desirable to further secure the connector 500 and lugs in place once the connector 500 is slideably engaged to the lugs. As shown in FIG. 9B, a mating connector portion 550 is provided to slideably engage the opposite ends of the lugs that have already been engaged by the connector portion 510. The second, or mating, connector portion 550 slides over the first portion 510 and secures the lugs from the opposite side (not shown).

Once in place, the lug and connector assembly comprising the connector portion 510, or the assembly also comprising the mating connector portion 550, may be inverted and dipped into a molten lead or lead-alloy bath to bond the connector to the lugs. This manner of dipping and coating is known in the art as "wave soldering."

Figure 9C:
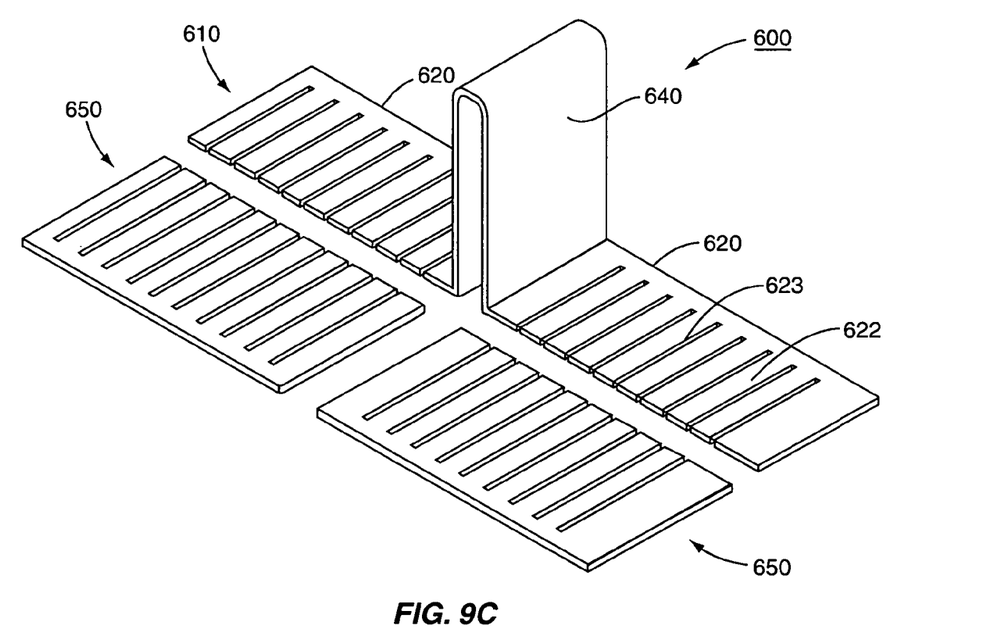
Figure 9D:
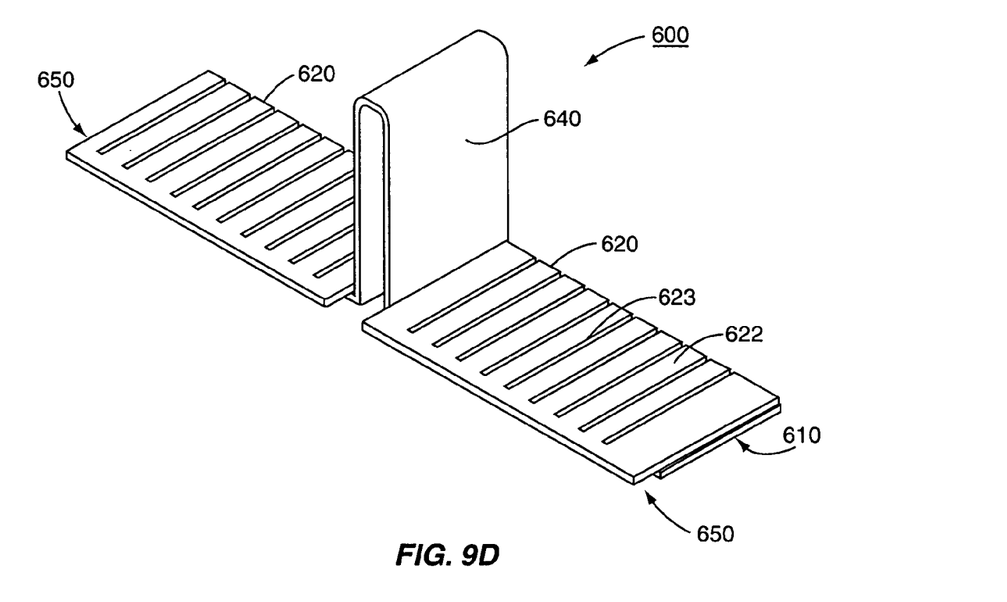

Turning now to FIGS. 9C and 9D, the second multi-piece embodiment 600 comprises a first connector portion 610 and second connector formed of a pair of mating connector portions 650. The first connector portion again comprises a pair of opposed flanges 620 and a strap portion 640. Each flange 620 comprises a bottom wall 622 having a plurality of spaced slots 623 therein. Again, the slots 623 extend outwardly from a point spaced from one edge of the bottom wall 622 to the opposed edge of the bottom wall 622, wherein the slots are open on the opposed outer edge. Again, the flanges 620 and strap portion 640 are formed of a metal substrate having a lead-based outer coating. To secure the connector 600 in place once the first connector portion 610 slideably receives the lugs, each one of the opposed pair of mating connector portions 650 slideably engages the opposite ends of the lugs on each of the opposed flanges 620. In this embodiment of the connector 600, connector portions 650 thus lack an attached strap portion, facilitating connection of the connector 600 when separate installation of each connector 650 is more conveniently performed. As shown in FIG. 9D, each of the opposed pair of mating portions 650 slides over the first portion 610 at least partially. Again, once in place, the plate and connector assembly may be inverted and dipped into a molten lead or lead-alloy bath to cover the lugs and bond the three portions 610 and pair 650 to the lugs.

Figure 10A:
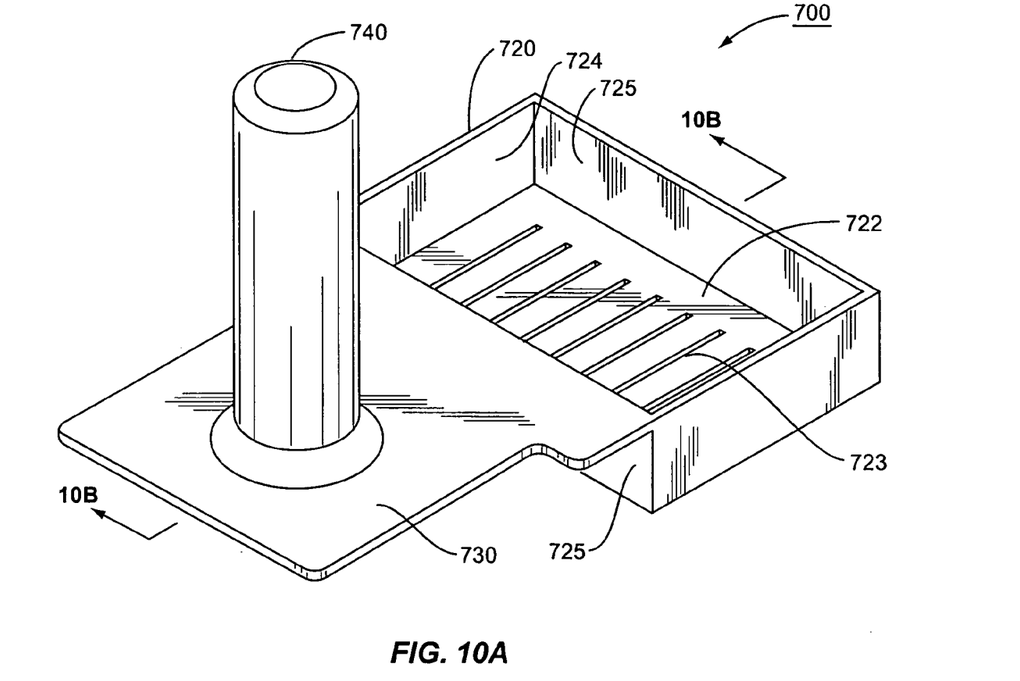
FIG. 10A is a top perspective view of one embodiment of a terminal connector formed in accordance with the present invention.
Figure 10B:
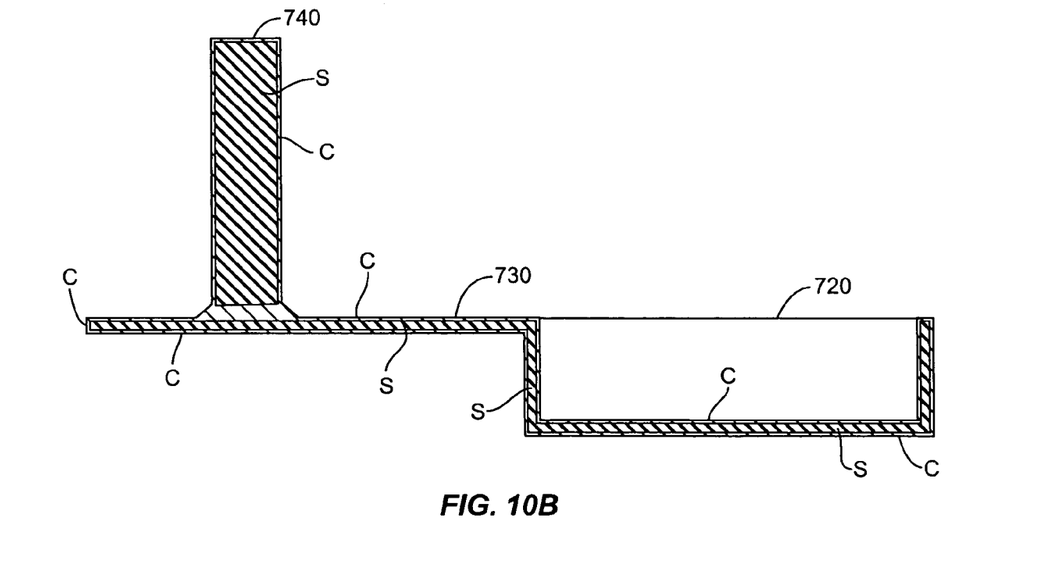
FIG. 10B is a sectional view of the intercell connector of FIG. 9 taken along Line 10-10.

Turning now to FIGS. 10A and 10B, another aspect of the present invention is directed to a terminal connector 700. As is established in the art, terminal connectors are used to connect the plate lugs to the terminal posts on end cells 140 of a monobloc. The positive plates are connected to the positive terminal post on one end cell and the negative plates are connected to the negative terminal post on another end cell. Again, the terminal connector 700 comprises a cell plate connector in the form of a tray 720 having a bottom wall 722 and opposed side walls 724, 725. Slots 723 formed in the bottom wall 722 are spaced for receiving the lugs, either for a positive terminal connection or a negative terminal connection. A strap in the form of a flange 730 extends outwardly from the upper edge of one of the side walls 725. A terminal post 740 is connected to the flange for ultimate connection to an external load, such as a motor. The tray 720 and flange 730 are formed in the same manner as the intercell connectors 200, 300, and 400 except for the terminal post 740. The terminal post 740 also comprises a metal substrate S of similar material that is coated with a lead-based corrosion prevention outer coating; however, the post is so formed in a cylindrical shape to accommodate termination provisions in the cover (not shown). Further, in one embodiment the post 740 is formed separately and then welded or soldered to the flange 730 for a rigid connection. Alternatively, a pure lead or lead alloy post may be cast directly as an upstanding member extending from the face of the flange 730. As with the trays of the other connectors, once the tray 720 is situated over the lugs of the selected cell, a molten lead is added to bond the lugs.

In another aspect, the terminal connector 700 of the present invention may comprise a cell plate connector in the form of a simple slotted plate and a flange, without any side or end walls. The slots formed in the bottom wall may also extend outwardly to an edge of the bottom wall where they are open on that edge for slideable engagement with a selected set of lugs. Further, the terminal connector may also comprise a multi-part construction, functionally similar to FIGS. 9C and 9D, wherein a mating connector portion is provided and dimensioned for mating engagement with the slotted plate and alignment with the slots formed therein.

Certain modifications and improvements will occur to those skilled in the art upon a reading of the foregoing description. It should be understood that all such modification and improvements, while not discussed in detail hereinabove, are properly within the scope of the following claims.

We claim:

1. A lead acid storage battery, comprising:
 (a) a plurality of cells, each cell including alternating positive and negative plates at least partially submerged in acid electrolyte, each plate including an upstanding lug;

(b) partitions for separating adjacent cells;

(c) at least one lightweight connector, comprising:

(i) at least one cell plate connector for electrically connecting the plates of a cell including a prefabricated tray formed by a bottom wall and a plurality of opposed side and end walls, the bottom wall having a plurality of spaced slots therein for receiving therethrough the lugs from either the positive or negative plates of the cell, the lugs projecting upwardly above the bottom wall a prescribed distance;

(ii) a strap extending from an upper edge of one of the side and end walls of the cell plate connector;

(iii) the cell plate connector and the strap being formed of a metal substrate that has a lower specific gravity and higher conductivity than lead, the bottom walls, sidewalls, and end walls of the tray and the straps being covered by a lead-based outer coating that resists the corrosive effects of the battery acid; and (iv) a lead-based material deposited in the tray around the lugs to a depth of between 0.05 inches and 0.50 inches to bond the lugs therein.

2. The battery of claim 1 wherein the lightweight connector is an intercell connector electrically connecting two adjacent cells in the battery and including two of the cell plate connectors, the tray of one connector connecting to the positive lugs of one cell and the tray of the other connector connecting to the negative lugs of an adjacent cell, the straps extending from the two trays being interconnected in such a manner as to form an inverted U-shaped member bridging the partition between the adjacent cells.

3. The battery of claim 1 wherein the metal substrate:

(a) is selected from the group of materials consisting of copper, aluminum, magnesium, and alloys thereof; and (b) has a thickness of between about 0.010 inches and 0.100 inches.

4. The battery of claim 3 wherein the metal substrate is copper having a thickness of between about 0.020 inches and 0.060 inches.

5. The battery of claim 1 wherein the lead-based outer coating:

(a) is selected from the group of materials consisting of lead, a lead-tin alloy, a lead-tin-sliver alloy and a lead-antimony alloy; and (b) has a thickness of between about 0.001 inches and 0.010 inches.

6. The battery of claim 5 wherein the lead-based outer coating has a thickness of between about 0.003 inches and 0.006 inches.

7. The battery of claim 1 wherein the lead-based material deposited in the tray around the lugs has a depth of between about 0.050 inches and 0.500 inches.

8. The battery of claim 1 wherein the lead-based material deposited in the tray around the lugs has a depth of between about 0.100 inches and 0.200 inches.

9. The battery of claim 5 wherein the lead-tin alloy comprises between about 0.5 percent and 5 percent tin, the lead-tin-silver alloy comprises between about 0.5 percent and 5.0 percent tin plus between about 0.005 percent and 0.05 percent silver, and the lead-antimony alloy comprises between about 1 percent and 10 percent antimony.

* * * * *